United States Patent Office 3,333,485
Patented Aug. 1, 1967

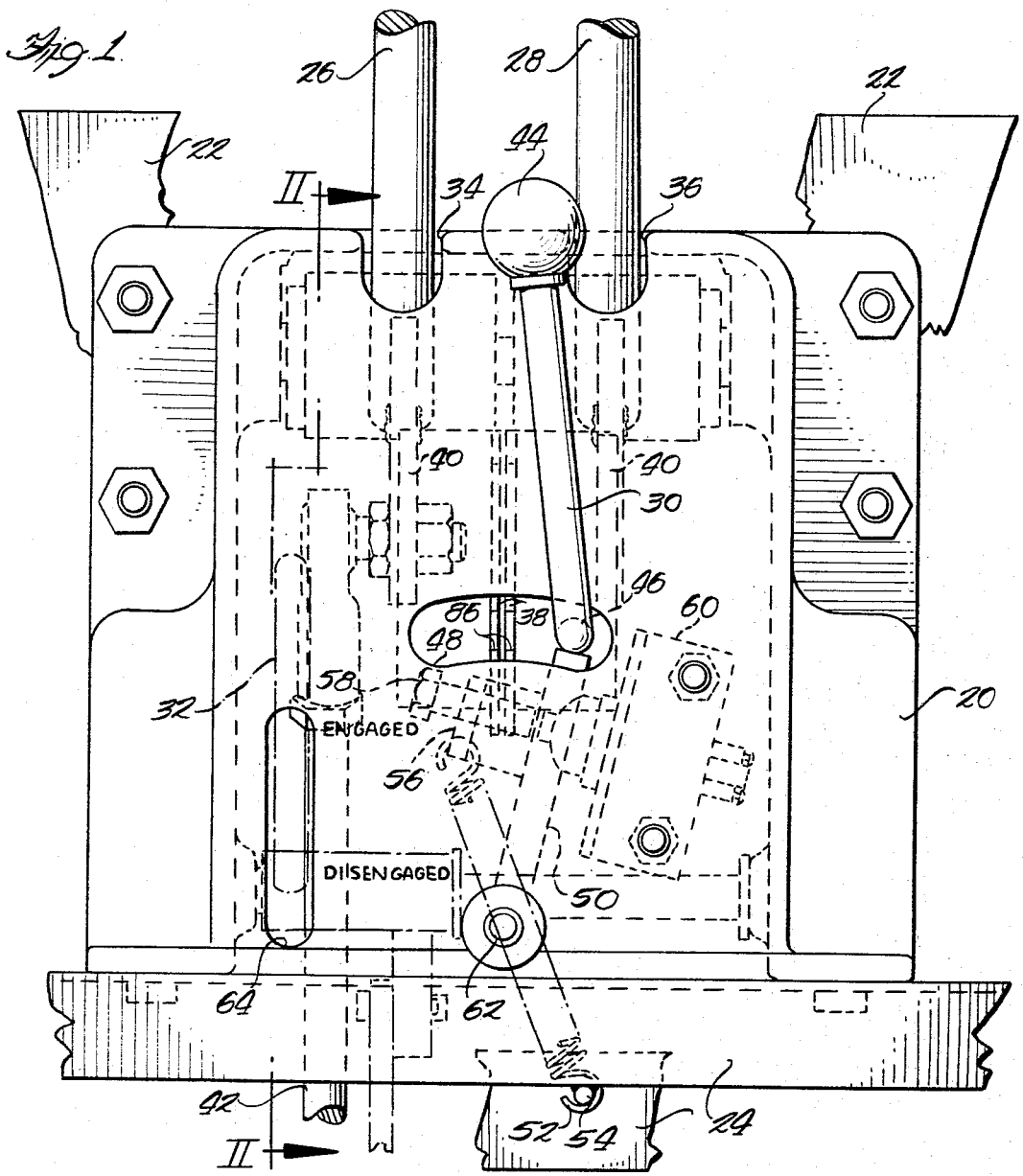

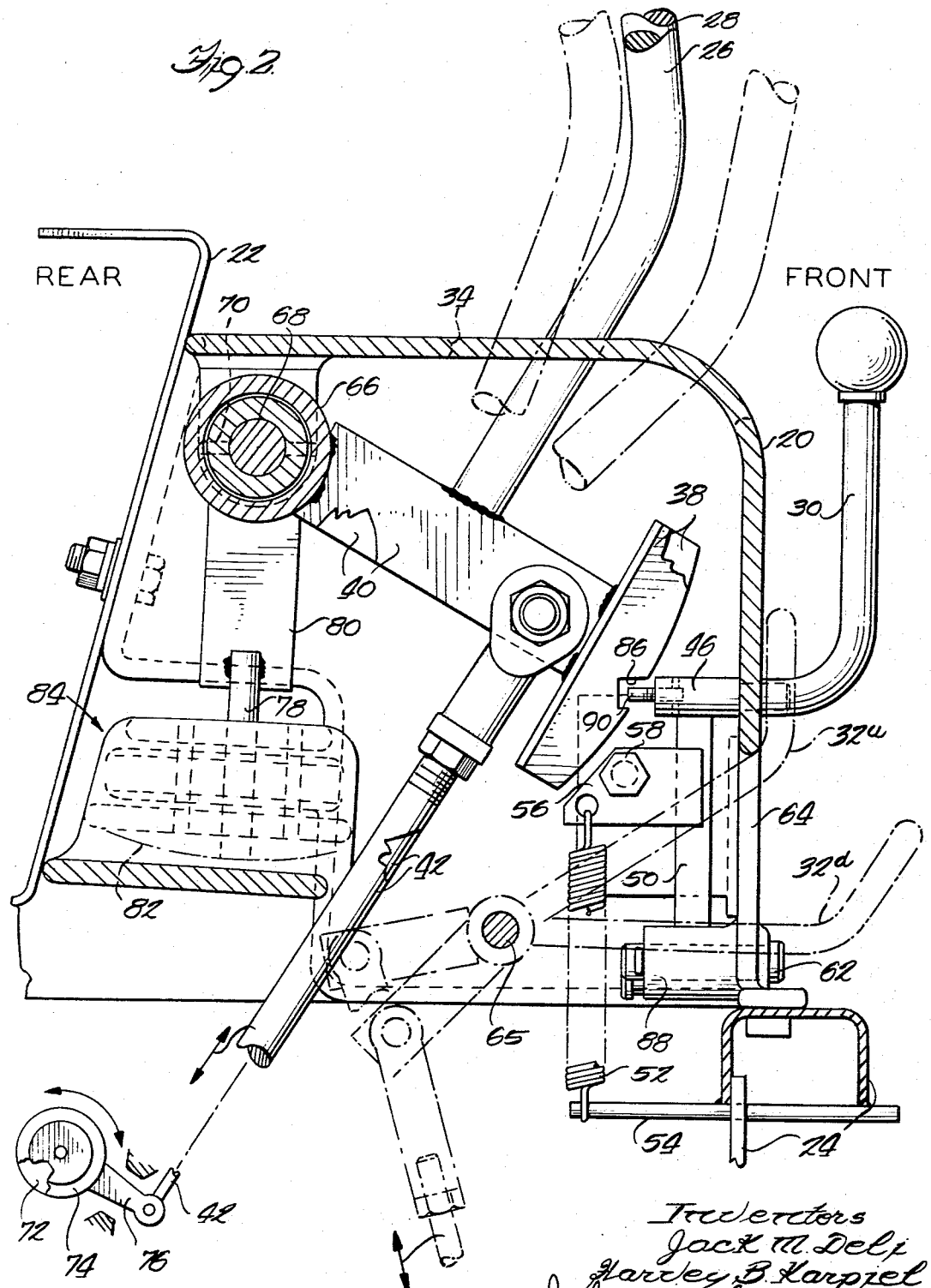

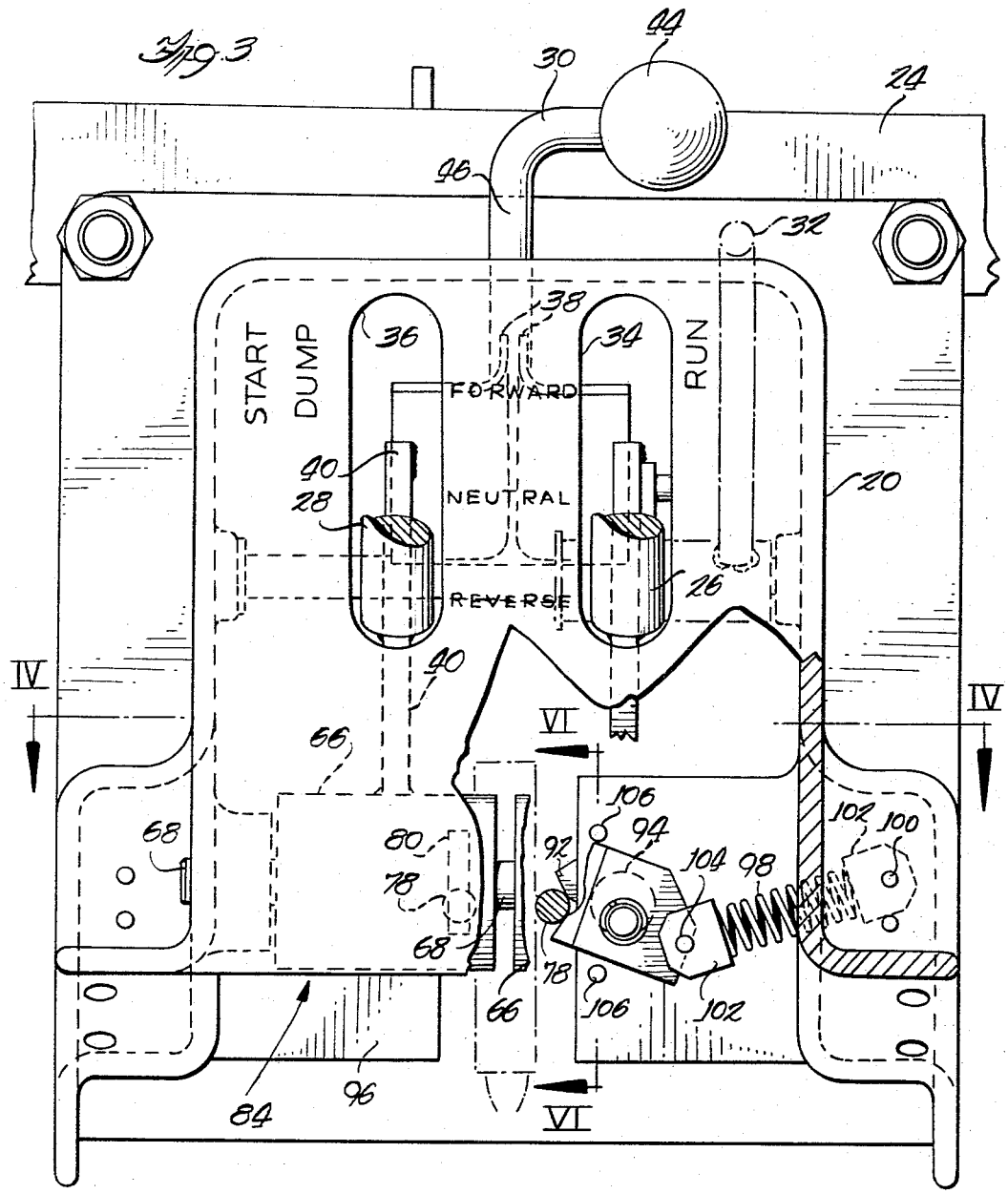

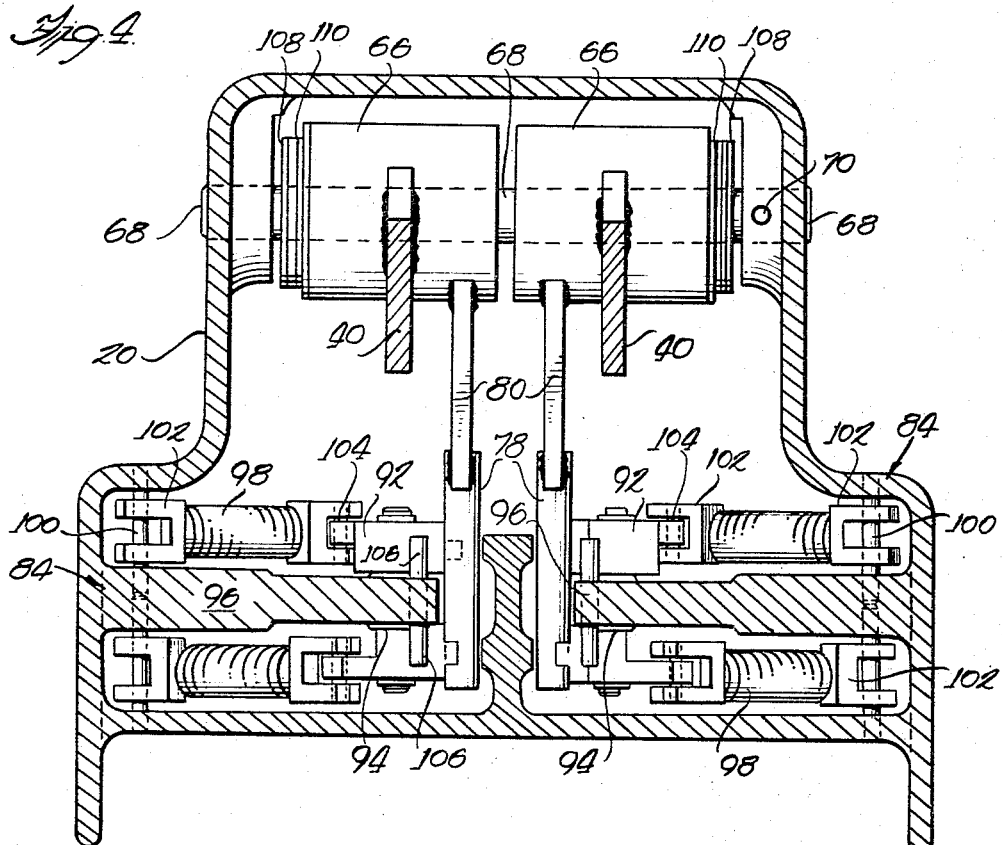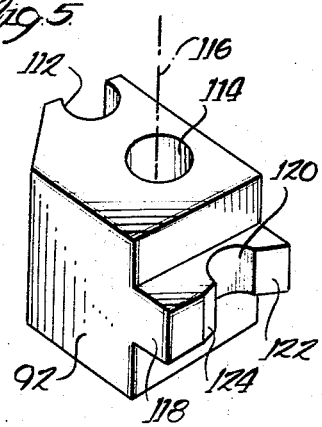

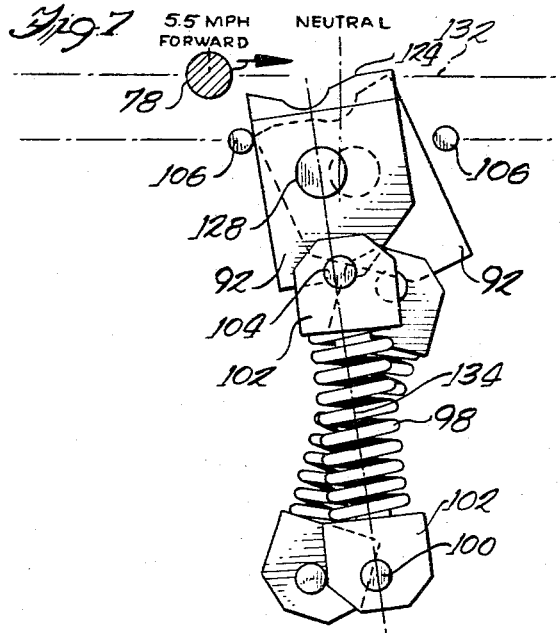
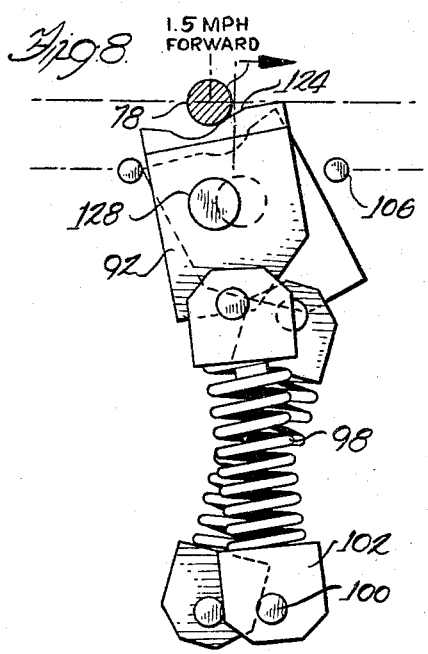
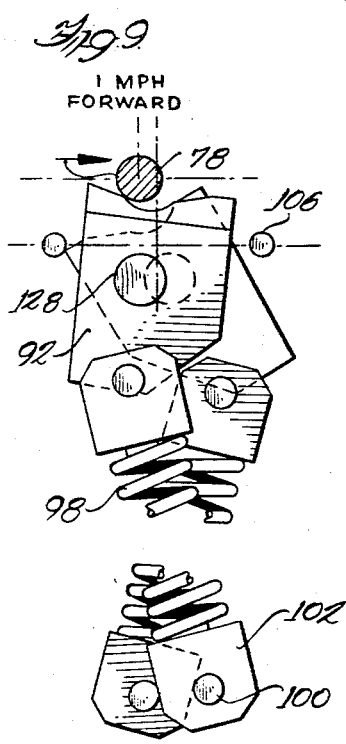
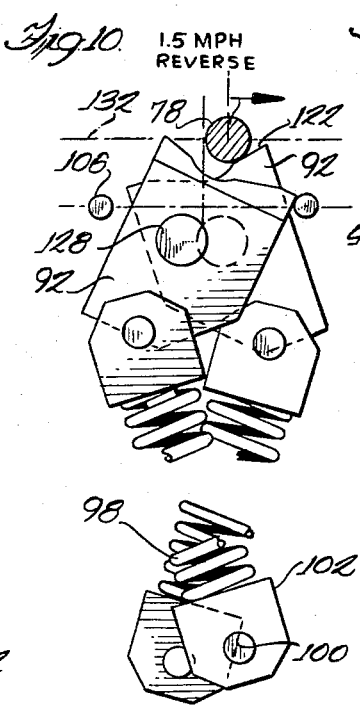
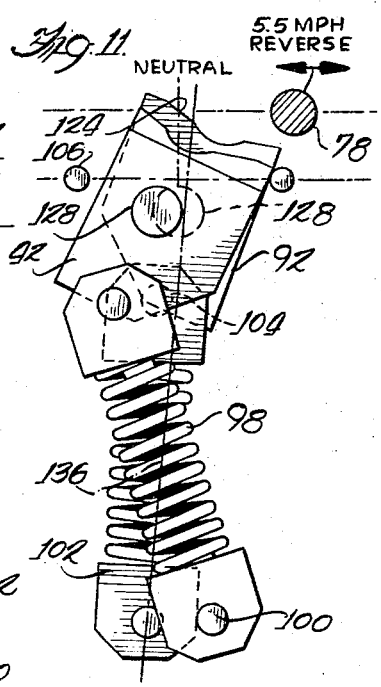

3,333,485
FORWARD-REVERSE DRIVE CONTROL
Jack M. Deli, Wheaton, and Harvey B. Karpiel, Roselle, Ill., assignors to International Harvester Company, a corporation of Delaware
Filed Sept. 27, 1965, Ser. No. 490,565
19 Claims. (Cl. 74—479)

The present application pertains to a forward-reverse drive control for a vehicle which is steered by driving and which has an infinitely variable ratio, hydrostatic drive effective at each side.

Our invention relates to the left and right steering levers for controlling by hydrostatic power transmission of such a vehicle, and particularly relates to a spring linkage for each steering lever which automatically takes over and urges that lever toward neutral position whenever it is in the vicinity of neutral. The practical effect is to make the power transmission a neutral seeking transmission, except when it is driving the vehicle at moderate or higher speeds. The operator moves the steering levers at will, simply overriding the linkage by hand pressure on the levers.

Hydrostatic power transmissions provide an infinitely variable ratio drive between their neutral or zero speed and each maximum speed afforded thereby in the forward and rear directions. A disadvantage of applying such a sensitively adjustable transmission to a vehicle, particularly to an implement-carrying crawler vehicle, is that, without constant attention of the operator to keep the transmission precisely in neutral, the crawler may tend to drift or creep out of a parking location because of a slight drive exerted by the transmission one way or the other.

Thus if the crawler is equipped with an appropriate implement to perform back-hoeing, unloading, hoisting, winching, or like operations from a stable vantage point, the operator is diverted from paying full attention to the implement and must turn his eye from time to time to check on the setting of the steering levers. The distraction is a problem because the working operation is not performed with optimum efficiency. A more serious problem is that the crawler is in danger of tpping if it starts unwanted drifting while coping with, or swinging, an outrigger or cantilever load.

Our invention materially reduces or eliminates the foregoing problems. At the same time, it affords definite advantages, as in the case of an hydrostatic tractor in which the neutral position has the inherent effect of a positive brake, simply due to hydraulically locking the crawler tractor drive motors. In that case, the tractor operator, who while dozing or loading wants to stop the tractor, flips the steering levers by hand toward neutral, or merely releases his hands from them if the levers are already in the neutral seeking zone. He thus brings the tractor to a positive stop, without the operator hunting for the neutral position and without need to set the brakes on the tractor.

Further features, objects, and advantages will either be specifically pointed out or become apparent when, for a better understanding of the invention, reference is made to the accompanying drawings which show a preferred embodiment thereof and in which:

FIGURE 1 is a front elevational view of a control console primarily adapted for a crawler vehicle and embodying the present invention;

FIGURE 2 is a right side, elevational view taken along the section lines II—II of FIGURE 1;

FIGURE 3 is a top plan view, with some of the internal parts partially broken out;

FIGURES 4 and 6 are respectively front and side elevational views showing internal details and taken along the section lines IV—IV and VI—VI of FIGURE 3;

FIGURE 5 is an isometric view of a representative one of the levers employed in the several spring linkages in the console for setting the vehicle transmission in neutral; and FIGURES 7, 8, 9, 10 and 11 are plan views of cooperating spring linkages showing a sequence of operations thereof.

For simplification, the drawings do not include a showing of the crawler or track-laying vehicle and its power train, which are of a known construction forming no per se part of the present invention. Briefly, the main components of a power train as herein contemplated consist of an engine, a hydrostatic transmission, and a mechanically disconnectable, splined clutch connecting the engine and the transmission. The hydrostatic transmission comprises left and right, variable displacement, hydraulic motors disposed one on each of the opposite sides of the vehicle for driving the endless track at that side, a pair of bypassable, variable displacement drive pumps each hydraulically connected to a different one of the motors for driving the tracks independently, and a common, splitter box of gearing which is coupled to the engine by the aforesaid splined clutch and which has the pair of drive pumps connected to split output shafts from the splitter box. Four operator-operated levers provide the basic controls, hereinafter more particularly described, and consist of a right steering lever connected to displacement controlling, servomechanisms which operate the respective swash plates of the right motor and its associated drive pump to set the direction of rotation and speed of the right track, a left steering lever connected to displacement controlling, servomechanisms which operate the respective swash plates of the left motor and its associated pump to set the direction of rotation and speed of the left track, a dump-run lever connected to the by-passes of the pair of drive pumps for dumping the full output of the pumps or applying the pump outputs to the respective motors, and a mechanical disconnect lever connected to the splined clutch and enabling the operator to turn over or run the engine with or without driving the splitter box and drive pumps.

More particularly as shown in FIGURE 1 of the drawings, a vehicle control console is provided having a housing 20 which is supported on the vehicle seat structure 22 and the vehicle body structure 24, and which pivotally supports the four control levers referred to, namely, the right steering lever 26, the left steering lever 28, and the dump-run lever 30, all indicated in solid lines, and the mechanical disconnect lever 32 indicated in broken lines. The steering levers 26 and 28 carry, at their upper ends, a handle or knob, not shown, which is approximately at the level of the waist of the vehicle operator. The levers extend downwardly through longitudinal slots 34 and 36 in the housing 20 and form integral parts of left and right arm assemblies, the assemblies being identically numbered and only one of which will be specifically described. The right steering lever 26 and a blocker segment 38 are secured to a common steering arm 40 in the assembly having a forwardly projecting free end. A motor operating, interconnecting link 42 is pivoted to and depends from the steering arm 40.

The dump-run lever 30 carries a knob 44 at its upstanding end and has an integral leg 46 bent at right angles thereto and protruding rearwardly through an arcuate slot 48 in the front of housing 20. The lever 30 is an integral part of a bar assembly including a bar 50 which at its free upper end is welded to the leg 46 of the lever 30. An overcenter spring 52 is hooked at the lower end to a pin 54 on the body structure 24 of the vehicle and, at its upper end, the spring is hooked in an opening formed in a bracket 56 carried by the bar 50. The lever 30 and the bar 50 can be moved to the right as viewed in FIGURE 1 into an over-travel position, not shown, in which an engageable bolt 58 threaded into the bracket 56 will engage a confronting start button on a starter switch 60 fixed within the housing 20. The bar 50 has securement means whereby it is secured for swinging movement on a pivot pin 62 carried by the console housing 20.

A vertical slot 64 in the front of the housing 20 accommodates pivotal movement of the mechanical disconnect lever 32 as it rocks on a fixed pivot 65 (FIGURE 2).

In FIGURE 2, each arm assembly includes a sleeve 66 which is welded to the associated steering arm 40 and which has means of securement to a fixed supporting shaft 68 which is fastened by a pin 70 to prevent movement thereof in the housing 20. From their neutral positions indicated by the solid lines 26 and 28 in FIGURE 2, the steering levers move into a forward range into positions such as the one indicated by broken lines, and move into a reverse or rear range into positions such as the one indicated by broken lines. The levers 26 and 28 are each connected through their associated arm assembly to a separate pair of servomechanisms, the right pair being collectively indictaed at 74 and the left pair being collectively indicated at 72. Downward movement as viewed in FIGURE 2, of either interconnecting link 42 moves a crank 76 and the pair of servomechanisms controlled thereby, causing the associated motor, not shown, to drive forwardly by progressive speed increments according to the degree of displacement of the link 42, and progressive upward movement of the link 42 from neutral swings the crank 76 in a like direction causing the associated motor to drive rearwardly by progressive speed increments. Each crank 76 operates between two stops so as to limit the adjustment to a maximum speed forward and a maximum speed rearwardly of the motor for each track of the vehicle.

Each arm assembly includes a depending pin 78 carried on a depending bellcrank leg 80. The tips of the pins 78 travel along parallel arcs 82 about the common fixed shaft 68 and their motion at midswing is controlled by left and right linkage devices generally indicated at 84.

Each of the blocker segments 38 in one arm assembly includes a gate 86 formed by slotting so that, when the steering levers 26 and 28 are in neutral position, the dump-run 30 is free to pivot both ways. The securement means for securing the bar 50 and the lever 30 for swinging includes a sleeve 88 received on the pin 62 for providing the necessary pivoting action.

The lever 30 pivotally carries at the rear end of its leg 46 a one-way, spring-biased pawl or lever 90 which has a normal, unpivoted position projecting rearwardly into the path of the blocker segments 38. If either of the steering levers is out of neutral position, the pawl or lever 90, under urging of a leaf spring, not shown, will be in the unpivoted position blocked by the blocker segment 38 of the associated arm assembly, to prevent the operator from advancing the lever 30 from the start and dump positions into the run position. Nevertheless, the dump-run lever 30 can move to dump or can overtravel to engage the starter when the blocker segments are in any position, because engagement of the latter by the pawl or lever 90 simply deflects the lever 90 temporarily to a pivoted position out of the way.

In FIGURE 3, the spring linkage devices 84, of which there are four, each have a lever 92 at one end which is secured to an eccentric pin on a fixed pivot 94. The pivot 94 is secured in a vertical position against turning and sliding on a horizontal mounting plate 96 which is integral with the housing 20. Each device 84 has a spring link 98 connecting the other end of the device to a fixed pin 100 secured in the housing 20. The spring link 98 of each device comprises a helical spring having a spring seat 102 at the outer end secured to the pin 100 and having an identical spring seat 102 secured at the inner end and forming an articulated interconnection 104 with the adjacent lever 92.

There are two of the mounting plates 96, each carrying one spring linkage device 84 on its upper face and one spring linkage device 84 on its lower face. A pair of spaced-apart vertical pins 106 fixed to each plate 96 adjacent its free edge provides stops to limit the arc of movement of the levers 92 on their pivots 94.

In FIGURE 4, the arm assemblies are coaxially arranged, side-by-side. The supporting shaft 68 fixed within the housing 20 carries a metal annulus 108 at each end which secures a rubber bushing 110 fast thereto. The means of securement, not shown, between the sleeve 66 of each arm assembly and the shaft 68 comprises another rubber bushing which frictionally engages the bushing 110. These bushings provide continuous contact with each other so as to prevent the arm assemblies from drifting out of position, save when they are close to the neutral position. Holidays are prvided in the rubber bushings at the appropriate places so that at or near the neutral position of the arm assemblies, there is no frictional resistance encountered and the spring linkage devices 84 exert the full biasing and holding effect on the left and right arm assemblies.

In FIGURE 5, the lever 92, as shown, is representative and has a semi-cylindrical recess 112 in the tail shelf at the rear to receive the articulated interconnection 104 from the spring link, not shown. A transverse vertical bore 114 through the lever 92 holds a bushing, not shown, and defines the rocking axis 116 thereof. A center ledge 118 at the front of the lever 92 has a semi-cylindrical recess 120 intermediate the front corners and, at one of those corners the ledge carries a neutralizing and cocking cam 122 intersecting the recess 120 and forming a slight diagonal angle with the front of the ledge 118. Adjacent the other front corner of the ledge, a tripping cam 124 is provided which also intersects the semi-cylindrical recess 120.

In FIGURE 6, the pivot 94 is press-fit into a bore in the horizontal mounting plate 96 and is held therein from turning by means of a key 126. The axes of the respective eccentric pins 128 on the common pivot 94 are slightly offset from the pivot and from one another so that the upper and lower levers 92 are displaced from exact superposition and thus can use the same set of stop pins 106. An individual bushing 130 fits within the bore 114 of each lever 92 so as to provide a bearing between that lever and the associated eccentric pin 128.

In FIGURE 7, which corresponds to the showing of FIGURE 3 except for positions of the parts and the fact that the plate 96 is omitted for clarity, the lever 92 of the linkage device which is in the upper or position nearest the viewer, presents the tripping cam 124 thereof so as to obstruct the path 132 of the pin 78. The pin 78 is shown within its forward range of travel, in a position equivalent to a vehicle forward speed of 5.5 m.p.h. for example. The articulated interconnection 104 in the linkage is at or just past a right reference line 134 between the eccentric pin 128 supporting the lever 92 and the second pin 100 supporting the spring link 98.

In FIGURE 8, the pin 78 has reached a position roughly equivalent to a 1.5 m.p.h. vehicle forward speed and makes initial engagement with the tripping cam 124.

In FIGURE 9, the pin 78 has moved just slightly closer to neutral position, thus tripping the lever 92 which executes quick movement in the overcenter direction causing the neutralizing and cocking cam 122 to catch up to the rear of the pin 78 and snap it toward neutral. The quickly assumed neutral position is illustrated in FIGURE 3, the respective levers 92 being biased by the spring links with one lever pressing on each side of the pin 78 so as to counter the bias of the other and reaching a mutually balanced position forcing the pin into a neutral setting.

The operator grasps and moves each steering lever in either direction from neutral, causing the pin 78 to take a position as shown in FIGURE 9 or to take an opposite position (in the rear range) as shown in FIGURE 10.

In the example of FIGURE 10, the pin 78 when it reaches a position equivalent to, for example, 1.5 m.p.h. in reverse, will have cocked the lever 92 which is in the lower or location farthest from the reviewer, into a poised position due to engaging the neutralizing and cocking cam 122 thereof and forcing it out of the path 132 of the pin.

FIGURE 11 shows the poised lever position just referred to, wherein the lever 92 presents its tripping cam 124 in the path of the pin 78. At this point, the articulated interconnection 104 is at or past a right reference line 136 connecting the eccentric pin connection 128 and the second pin connection 100 between the spring link 102 and the fixed housing, not shown. Potential energy is thus stored in the spring link 98 occupying the lower or position which is farthest from the viewer as shown in FIGURE 11.

In the two positions of the pin 78 shown in FIGURES 7 and 11, the associated arm assembly is frictionally held by the rubber bushings already described, so that the transmission setting does not tend to drift once it is established by the vehicle operator. Hand force by the operator will of course overcome such friction.

In the position of the pin 78 illustrated in FIGURES 9 and 10, a noticeable bias is on the pin 78 and it requires a conscious restraining force exerted by the operator to keep the vehicle moving at a speed of approximately 1.5 m.p.h. or less in either direction. On the other hand, when the operator applies no restraint after having moved either control lever into a position approximating neutral, he can thereafter leave the lever unattended with full assurance that the transmission will automatically seek and be retained in a neutral status unless and until changed by the operator.

In operation of the vehicle control console illustrated in the preceding figures, the operator has the choice of starting and running the engine without turning the pumps, merely by moving the mechanical disconnect lever into the down position shown by broken lines 32d in FIGURE 2. Driving requires the pumps to be run by the engine and for this purpose the operator moves the lever into the up position as shown by the broken lines 32u in FIGURE 2.

The operator then grasps the steering levers 26 and 28 and sets the hydrostatic transmission motors in a neutral setting, the arm assemblies rocking into a corresponding position such that the gates 84 are aligned as shown in FIGURE 2, allowing the pin 90 to pass freely through the planes of the blocker segments 38 when the lever 30 is operated.

The dump-run lever 30, from the position shown in FIGURE 3, is moved by the operator in its normal range of travel from the run position to the dump position, and then by over-travel is forced into a start position adjacent the position illustrated in FIGURE 1. During this amount of overtravel, lever 30 is in the extreme end of the slot 48 which is at the right as viewed in FIGURE 1, so as to close the starter switch 60 for cranking the vehicle engine. Upon termination of cranking, the lever 30 is returned to the dump position. Thereafter, the lever 30 is moved to the opposite end of the slot 48 so as to assume the run position, applying full output of the hydrostatic transmission pumps, not shown.

The operator, as can best be visualized in FIGURE 3, then adjusts the respective left and right steering levers 28 and 26 into the operating ranges desired so that the vehicle advances forwardly with the tracks turning together, rearwardly with the tracks turning together, or in a gradual turn or a pivoting turn by having the tracks move at dissimilar speeds or in opposite directions, if desired.

As herein disclosed, the console control is shown applied to a track laying vehicle primarily adapted for a hydrostatic drive employing left and right hydraulic motors. It is evident that individual, hydraulically clutched gearing, or that other motors can be employed, such as an individual electric motor provided for each track and included in an electro-mechanical drive. In any case, the drive will automatically neutralize once the steering levers approach the neutral setting and neither track will creep or drift. In the illustrative example, 1.5 m.p.h. is given as the vehicle speed at or below which our linkage devices attempt to take over for automatic neutralization and the operator can feel the overcenter movement by the devices and their subsequent resisting bias urging the levers to stay fixed in neutral. The maximum speed is preferably three or more times such given vehicle speed, illustratively being a speed (5.5 m.p.h. in the example) which is 3.7 times that of the given speed of 1.5 m.p.h.

What is claimed is:

1. In a vehicle having left and right drive controls each positionable in neutral or to and fro in forward and reverse ranges of drive:

the combination of left and right pins movable independently in parallel paths to settings corresponding to respective drive control positions;

linkages operatively related to present obstructing means to the pin paths adjacent the neutral setting of each pin; and means common to the pins and linkages supporting them in the operative relationship described;

said obstructing means comprising levers separate to each pin, disposed one pressing on each side thereof so as to counter the bias of the other lever and reaching a balanced position forcing the pin in neutral setting.

2. The invention of claim 1, the just said bias being effective for a limited travel of said pins, which pins have forward and reverse ranges of travel in opposite directions from the neutral setting, and each of which, for the major portion of its ranges of travel, being free from contact with the obstructing means.

3. The invention of claim 2, the obstructing means comprising said levers consisting of a neutralizing and cocking cam at the corner of each lever, and a tripping portion on each lever;

said linkages constituting spring biased, overcenter devices which are cammed into a cocked position by setting the pins from neutral into either range of travel, and which are tripped due to engagement of the tripping portions by the pins upon approaching neutral setting.

4. In a vehicle having left and right drive controls each positionable in neutral or to and fro in forward and reverse ranges of drive:

the combination of left and right pins movable independently in parallel paths to settings corresponding to respective drive control positions;

trippable linkages operatively related to the pin paths adjacent the neutral setting of the pins, and trippable by contact with, and due to movement of, the pins in a drive-range-leaving direction, so as forthwith to automatically bias the pins into neutral setting; and means common to the pins and linkages supporting them in the operative relationship described.

5. The invention of claim 4, there being four of said levers, two disposed at a side of the pins effective to bias them into neutral setting when the pin movement is in a forward-range-leaving direction, and two of the levers effective to bias the pins into neutral setting when the pin movement is in a reverse-range-leaving direction, each pin being thus disposed with a lever pressing on each side thereof so as to counter the bias of the other, and with the levers reaching a balanced position in which they force the pin into the neutral setting aforesaid.

6. In a vehicle having left and right steering arm assemblies each positionable in neutral or to and fro in forward and reverse ranges of drive:
- the combination of a housing for supporting the steering arm assemblies side-by-side for rocking movement;
- a blocking segment and a pin adapted to be carried by each assembly and movable thereby in separate paths of swing to settings corresponding to respective arm assembly positions;
- a run-dump lever mounted in the housing for movement to points of placement past the segments such that stop means thereon will intersect the paths of and be blocked in a direction of movement by the blocking segments;
- there being gates formed in the blocking segments which, when aligned due to the segments being swung to a neutral setting, define an unobstructed path for movement of the run-dump lever between its points of placement; and
- trippable devices located along the path of swing of said pins effective with a takeover action, when tripped thereby, for forcing each pin into the neutral setting when it approaches that setting.

7. The invention of claim 6, said devices constituting overcenter spring biased linkages one or other of which is cammed into a cocked position by setting the pins from neutral into the different ranges of travel, and which are tripped due to engagement of tripping portions of the linkages by the pins upon approach as aforesaid to their neutral setting.

8. The invention of claim 6, including overcenter means connecting between the run-dump lever and the housing to bias the run-dump lever into points of placement.

9. In a vehicle having left and right steering arm assemblies each positionable in neutral or to and fro in forward and reverse ranges of drive:
- the combination including housing means to support the steering arm assemblies side-by-side for rocking movement;
- a blocking segment included an each assembly and swingable thereby in a path to settings corresponding to respective arm assembly positions;
- a run-dump lever mounted in the housing for travel to points of placement past the segments such that stop means thereon will intersect the path of and be blocked in a direction of movement by the blocking segments;
- there being gates formed in the blocking segments which, when aligned due to the segments being swung to a neutral setting, define an unobstructed path for movement of the run-dump lever between its points of placement;
- said lever having a range of travel between a dump point at one side of the segments and a run point in which it is placed at the other side of the segments, and having overtravel at said one side, beyond the range to a start point; and
- a starter switch in the housing means fixed to confront the lever at the start point so that overtravel of the lever closes the starter switch.

10. The combination of claim 9,
- a pin included on each arm assembly and swingable by the assemblies in paths separate from the segments, but to settings corresponding to the respective arm assembly positions; and
- trippable linkage devices located along the path of swing of said pins effective with a takeover action, when tripped thereby, for forcing each pin into the neutral setting when it approaches that setting.

11. In a vehicle having left and right steering arm assemblies each positionable in neutral or to and fro and forward and reverse ranges of drive:
- the combination with said assemblies, of housing means therefor;
- said assemblies having means of securement to the housing means for rocking movement independently of and side-by-side to, one another;
- pins each included in a different one of said assemblies and movable independently of one another in paths of swing corresponding to respective steering arm assembly positions;
- said securement means comprising elastomeric bushings frictionally contacting means fixed with respect to the housing means, there being holidays in the frictional interface of contact whereby the bushings enable the assemblies to move freely in the vicinity of the neutral settings thereof and yet the bushings resist movement of the assemblies when the assemblies are appreciably in their ranges of drive setting; and
- spring linkage devices in the housing means disposed along the paths of swing of the pins for forcing the assemblies, when they are in the vicinity of neutral, into a precise neutral setting.

12. In a vehicle having left and right steering arm assemblies each positionable in neutral or to and fro in forward and reverse ranges of drive:
- the combination with said assemblies, of housing means therefor;
- means of securement between each assembly and housing means to support the assemblies for rocking movement side-by-side;
- pins included in the different assemblies movable in parallel paths of swing to settings corresponding to respective steering arm assembly positions;
- the means of securement between each assembly and the housing means comprising yieldable bushing means frictionally engageable with bushing means fixed with respect to the housing means, there being holidays in the structure of the bushing means substantially eliminating friction when the assemblies are in the vicinity of neutral setting and yet resisting movement of the assemblies when they are appreciably in either the forward or the reverse range of drive setting; and
- devices in the housing means disposed along the paths of swing of the pins and comprising spring biased overcenter linkages different ones of which are cammed into a cocked position by setting the pins from neutral into either range of travel, and which are tripped due to engagement of tripping portions on the linkages by the pins upon approaching neutral setting.

13. In a drive control positionable in neutral or to and fro in forward and reverse ranges of drive:
- the combination of a pin movable in a path to settings corresponding to respective drive control positions;
- linkages operatively related to present obstructing levers to the pin path adjacent the neutral setting of the pin;
- housing means supporting the pin and linkages in the operative relationship described;
- the lever of each linkage having a first connection on which it swings relative to the housing means, and a corner cam pressing on a side of the pin different from the side on which the corner cam of the other lever is simultaneously pressing; and
- a spring loaded snap link in each linkage having a second connection on which it swings relative to the housing means;
- the lever and link of each linkage having an articulated interconnection which, when the pin cams a corner cam so as to cock the associated lever and deflect the corner cam out of the path of the pin, moves from an overcenter position on one side of a right line through the first and second connections, to a poised position of the interconnection at least approximately across said line.

14. The invention of claim 13, each corner cam constituting a neutralizing and cocking cam on the associated lever, and a tripping cam on each lever which, when cammed by the pin due to movement approaching the neutral setting, trips the linkage whereby the lever accommodates with a like snap movement when its articulated interconnection to the spring loaded snap link snaps from the poised position into the overcenter position.

15. The invention of claim 13, said pins being movable from side-to-side independently; and
   a common pin in the housing on at least one side of the levers to limit swinging movement of both levers on that side.

16. The invention of claim 13, the first connection on which the lever of each linkage swings comprising a common pivot secured to the housing, and having two pins which are eccentric to one another, which extend in opposite directions, and each of which pivotally supports a different one of the levers on the common pivot.

17. The invention of claim 16, and including means preventing turning and sliding of the pivot, comprising a key between the pivot and the housing means.

18. The invention of claim 17, including a bored wall in said housing means in which the pivot is received in the bore with a friction fit and is secured thereto by means of said key.

19. In a drive control positionable in neutral or to and fro in forward and reverse ranges of drive:
   the combination of a pin movable in a path to settings corresponding to respective drive control positions;
   operatively opposed linkages structurally arranged to present obstructing levers to the pin path adjacent the neutral setting of the pin;
   housing means supporting the pin and linkages in the structural arrangement described;
   the lever of each linkage having a first connection on which it swings relative to the housing means, and a corner cam pressing on a side of the pin different from the side on which the corner cam of the operatively opposed lever is simultaneously pressing; and
   a snap link in each linkage having a second connection on which it swings relative to the housing means;
   the lever and snap link of each linkage having an articulated interconnection which, when the pin cams a corner cam so as to cock the associated lever and deflect the corner cam out of the path of the pin, moves from an overcenter position on one side of a right line to the first and second connections, to a poised position of the interconnection at least approximately across said line;
   each snap link comprising a spring seat included in the second connection, a spring seat included in the articulated interconnection, and a coil spring acting in the space between and engaging the spring seats.

References Cited

UNITED STATES PATENTS 2,955,483   10/1960   Slomer _____ 74—479 X

MILTON KAUFMAN, *Primary Examiner.*